United States Patent [19]

Van Wyk

[11] Patent Number: 5,132,689
[45] Date of Patent: Jul. 21, 1992

[54] DUAL FUNCTION RADAR RECEIVER

[75] Inventor: Rogell Van Wyk, La Palma, Calif.

[73] Assignee: Rockwell International Corporation, Seal Beach, Calif.

[21] Appl. No.: 737,007

[22] Filed: Jul. 29, 1991

[51] Int. Cl.[5] .............................................. G01S 13/00
[52] U.S. Cl. ...................................................... 342/96
[58] Field of Search .................. 342/96, 136, 139, 149

[56] References Cited

U.S. PATENT DOCUMENTS

| | | |
|---|---|---|
| 4,215,936 | 8/1980 | Winocur . |
| 4,509,049 | 4/1985 | Haendel et al. . |
| 4,587,523 | 5/1986 | Shupe ............................ 342/149 |
| 4,679,207 | 7/1987 | Tsuda ........................ 342/149 X |

Primary Examiner—Mark Hellner
Attorney, Agent, or Firm—H. Fredrick Hamann; George A. Montanye; Tom Streeter

[57] ABSTRACT

The Dual Function Radar Receiver shown provides hardware commonality between detection and tracking modes. Four channels (56, 58, 60, 62) are provided, each of which searches a separate range bin during the detection mode. During the tracking mode, one channel (56) continues to search a range bin, while the second channel (58) servos the range bin to the range of the detected object. The third channel (60) processes the azimuthal difference signal (94), and the fourth channel processes the elevational difference signal (110).

3 Claims, 4 Drawing Sheets

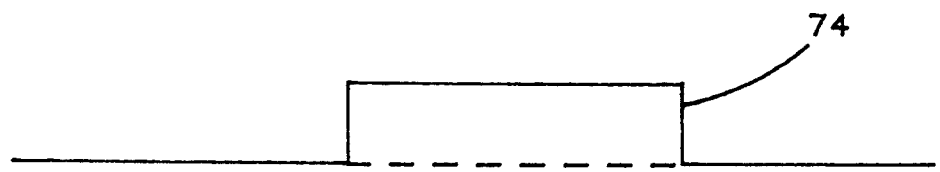
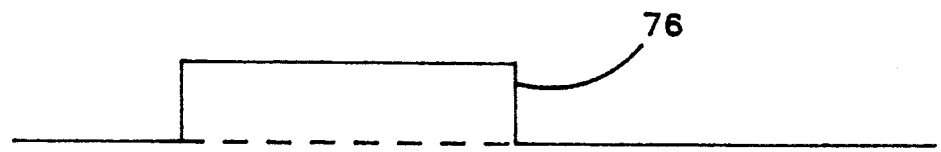
FIG. 5
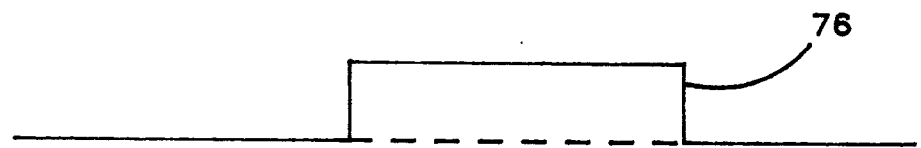
FIG. 6

DUAL FUNCTION RADAR RECEIVER

This invention was made with Government support under Contract No. DASG60-87-C-0031 awarded by the Army. The Government has certain rights in this invention.

BACKGROUND OF THE INVENTION

The present invention relates to radar receivers, and has particular relation to radar receivers which both detect and track objects.

A radar receiver must first detect an object, and then, having detected it, must track it. Detection generally does not require that the direction (azimuth and elevation) be known, only that the range be known. Tracking, however, requires continuous monitoring of all three variables. Separate apparatus has, therefore, heretofore been necessary when, as is common, the same radar is to be used both to detect and to track an object. Such separate apparatus unduly increases cost, size, and weight of the radar.

SUMMARY OF THE INVENTION

It is an object of the present invention to increase the commonality of the apparatus used to track an object with the apparatus used to detect it. It does so by providing four separate channels, each of which searches a separate range bin when the radar is in the detection mode. In the tracking mode, however, only the first channel is used for range purposes. The second channel dithers between the edges of the first range bin, while the third and fourth channels are diverted, respectively, to searching azimuthal and elevational different signals in the first range bin.

BRIEF DESCRIPTION OF THE DRAWINGS

FIGS. 5 and 6 demonstrate the delayed dithering between channels 1 and 2 shown in FIG. 4.

DETAILED DESCRIPTION OF A PREFERRED EMBODIMENT

Figure 1:
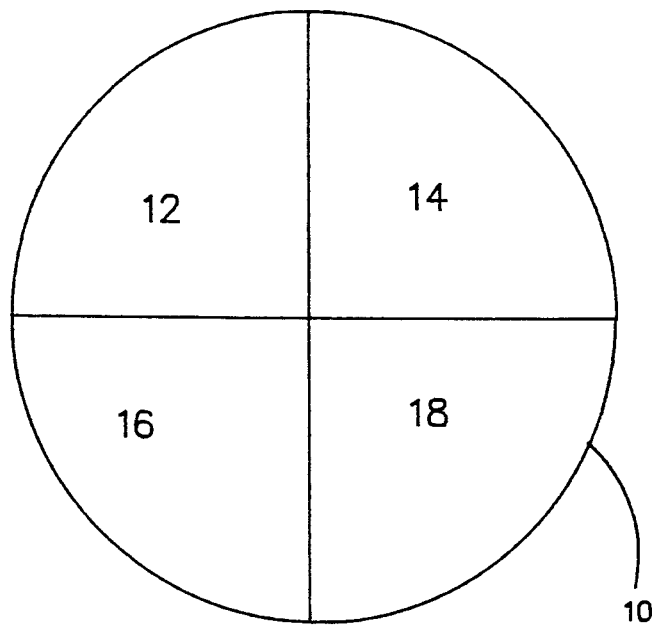
FIG. 1 shows a frontal view of a flat plate radar antenna.

In FIG. 1, a flat plate antenna 10 includes an upper left quadrant 12, an upper right quadrant 14, a lower left quadrant 16, and a lower right quadrant 18. When a transmitted signal is reflected from an object and is received by these four quadrants 12, 14, 16, and 18, the outputs from these four quadrants may be summed to produce an overall signal, the delay between the receipt of this overall signal and the transmission of the original signal being an indication of the range to the object. If the object lies to the left of the antenna, it will produce a stronger signal in left quadrants 12 and 16 than it does in right quadrants 14 and 18. The outputs from quadrants 12 and 16 are therefore summed into a left signal, the outputs of right quadrants 14 and 18 are therefore summed into a right signal. The difference between the left signal and the right signal is an indication of the azimuthal direction of the object with respect to the antenna. Likewise, the signals from the top quadrants 12 and 14 may be summed into an upper signal, and those from the lower quadrants 16 and 18 may be summed into a lower signal, the difference between the upper and lower signals indicating the elevational angle of the object with respect to the antenna. The range, azimuthal, and elevational signals may then be separately processed, as is well known in the art.

Figure 2:
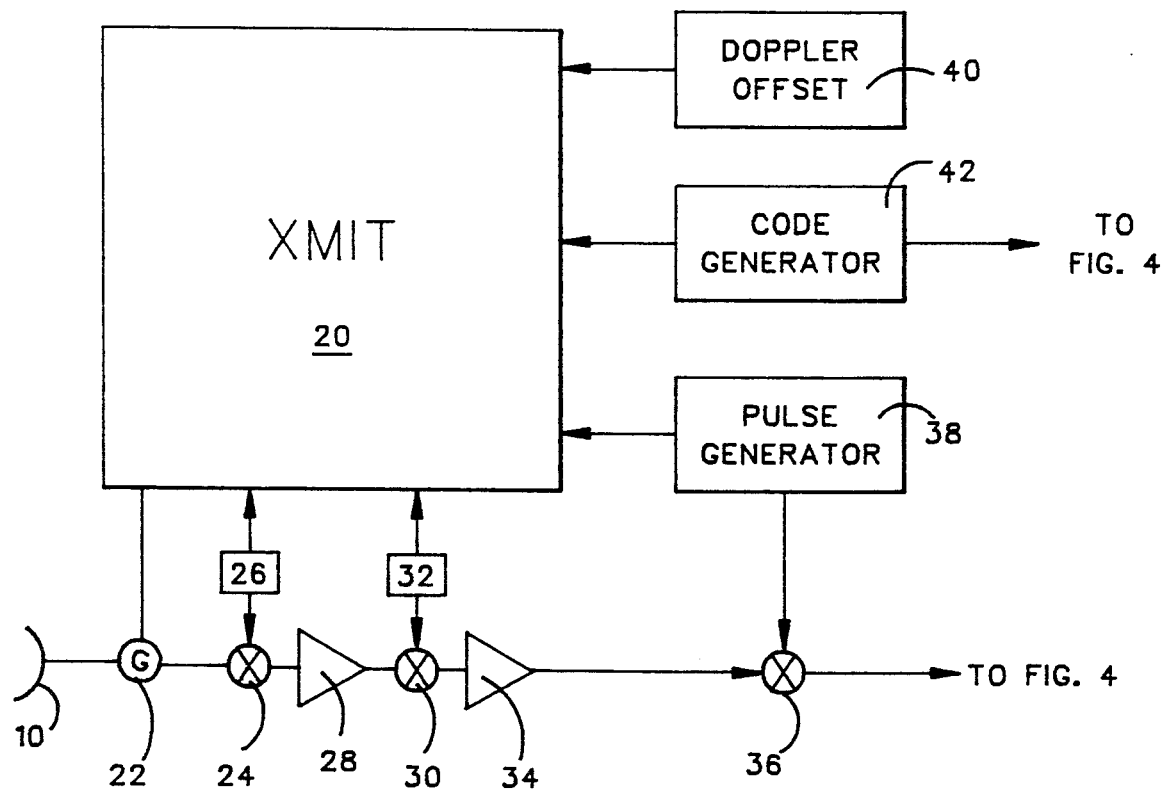
FIG. 2 shows a schematic drawing of the front end electronics of the present invention.

In FIG. 2, a transmitter 20 emits a signal to a circulator 22 which passes it to the antenna 10 and prevents it from passing into the first mixer 24 and thence down the receiving path. Having allowed the transmitted signal to pass to the antenna, the circulator 22 then cuts off any further signaling from the transmitter 20, and allows the reflected signal detected by the antenna 10 to be passed to the first mixer 24 and thence down the receiving chain.

The first mixer 24 combines the signal received from the circulator 22 with the signal received from a first local oscillator 26. The first local oscillator 26 typically operates at around 30 gigahertz so that the transmitter 20 may operate in the $k_a$ band (30 to 38 gigahertz). The $k_a$ band is preferred since it includes several frequencies at which moisture in the air is essentially transparent, and because it permits the construction of radars with reasonable size and power requirements. Since the same first local oscillator 26 drives both the transmitter and the first mixer, the first mixer produces a partially demodulated signal, which is amplified by a first amplifier 28 and is passed on to a second mixer 30. The second mixer 30 is driven by a second local oscillator 32 which similarly drives the transmitter 20, and therefore further demodulates the reflected signal received from the antenna 10. This further demodulated signal is amplified by a second amplifier 34. The output of the second amplifier 34 is passed on to a third mixer 36, which mixes it with the output of a pulse generator 38. The pulse generator 38 produces pulses at a repetition frequency considerably lower than the frequencies produced by the first and second local oscillators 26 and 32. The third mixer 36 therefore acts as an window, similar and in addition to the circulator 22, allowing reflected signals received at the antenna 10 to be processed only when transmitted signals are not being emitted by the antenna 10.

A doppler offset local oscillator 40 also drives the transmitter 20, since the frequency of the emitted pulse and that of the received pulse will differ by an amount proportional to the relative velocities of the antenna and the object. This doppler difference might have been handled by making demodulation chain 24 through 34 more flexible, but the preferred method is to make the transmitter flexible. The frequency of the transmitter is adjusted so that the expected or detected relative velocity of the antenna and object will produce a reflected frequency which may be properly handled by the demodulating chain 24 through 34.

FIG. 2 shows a transmitter 20 driving a single antenna 10. In practice, as shown in FIG. 1, the antenna 10 is divided into four quadrants 12, 14, 16, and 18, each of which produces a separate signal which is passed through suitable separate apparatus. Other apparatus combines these signals into sum, azimuthal difference, and elevational difference signals. None of this is claimed by Applicant as comprising any part of this invention. These sum and difference signals, whether provided from replicas of the apparatus shown in FIG. 2 or from any other apparatus, may be fed to the apparatus shown in FIG. 4, with the sum signal being fed to node 54, the azimuthal difference signal being fed to pole 92, and the elevational difference signal being fed to pole 108, all as described hereafter in the discussion of FIG. 4.

Figure 3:
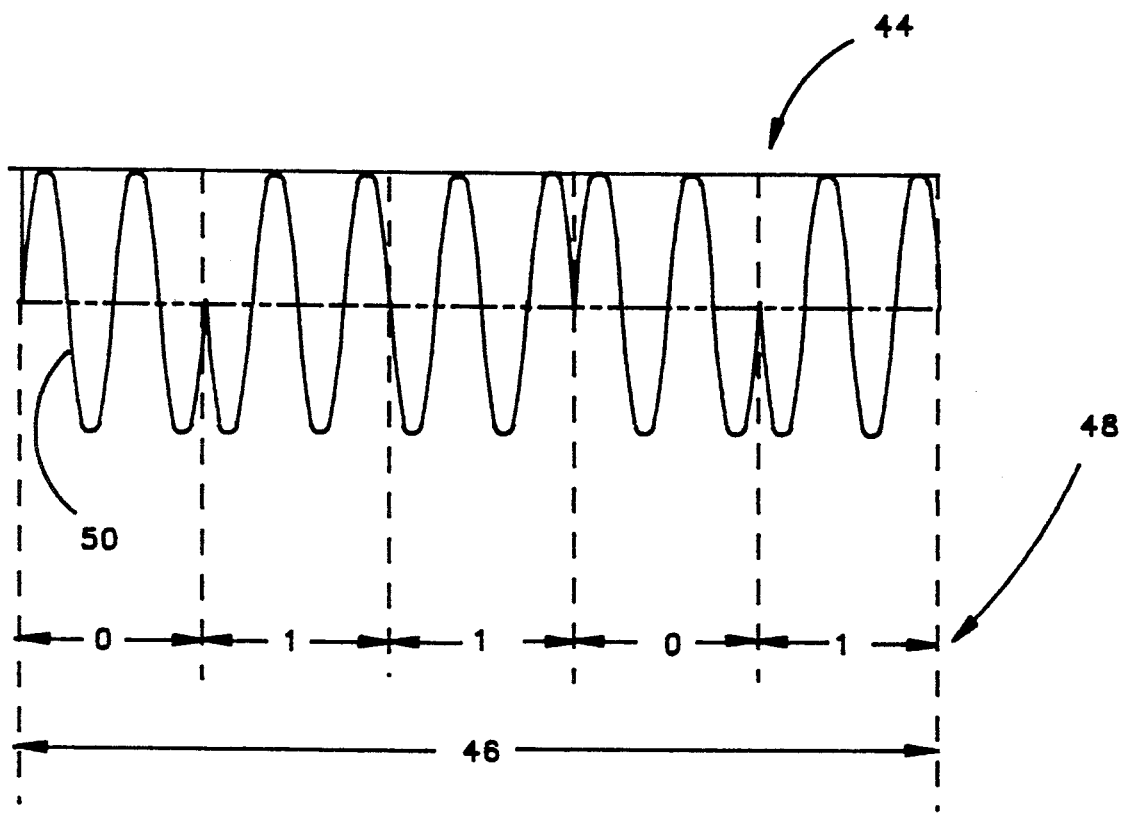
FIG. 3 shows a typical waveform produced by the code generator shown in FIG. 2.

FIG. 3 shows how the code generator 42 of FIG. 2 operates. A transmitted pulse 44 has a width 46, and the exact location (time of arrival) of this pulse, once reflected and received, can generally be detected only within the same order of magnitude as the width 46. However, it is possible to generate a binary sequence 48 of 0's and 1's, in which the carrier wave 50 is left unchanged if the bit is 0, but is inverted (given a 180° phase difference) if the bit is 1. When the signal is returned, it is combined with a delayed representation of the signal as transmitted. If each bit of the received signal lines up fairly precisely with the corresponding bit of the transmitted signal, the two signals will interfere constructively and will be easily detected. If they do not so line up, the signals will interfere destructively and will not be as easily detected. Further, different codes can be applied to different pulses so as to distinguish between different pulses from the same radar, if necessary.

Figure 4:
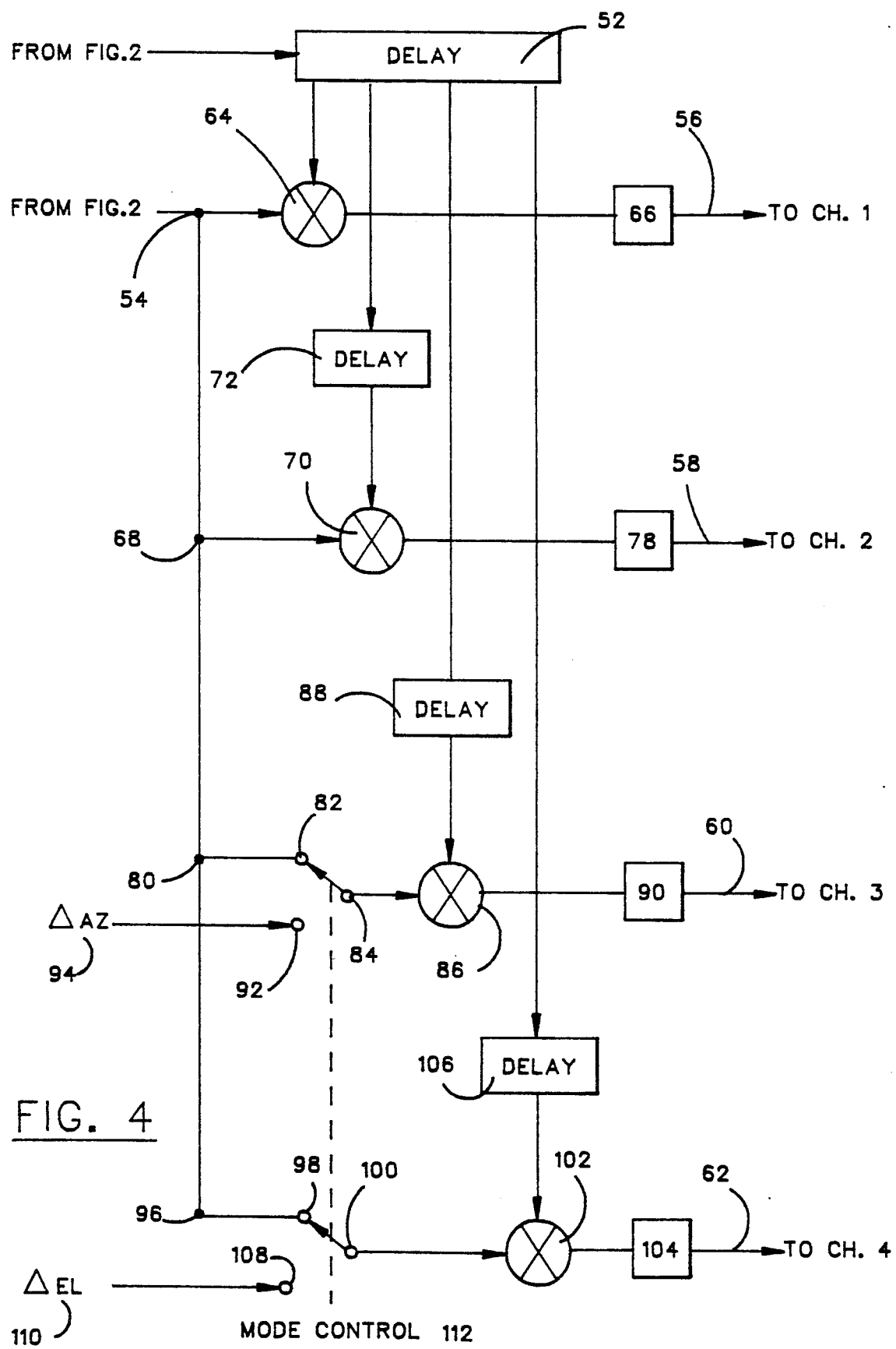
FIG. 4 shows the back end electronics of the present invention, and should be read in conjunction with FIG. 2.

In FIG. 4, the code generator 42 of FIG. 3 is seen as driving not only the transmitter 20 but also a first delay mechanism 52. The mixer 36 of FIG. 3 is shown as driving a first node 54, from which four separate channels 56, 58, 60, and 62 will eventually emerge.

The signal from first node 54 is mixed with the signal from the first delay mechanism 52 in the fourth mixer 64, and passes through a narrow bandpass filter 66, preferably a surface acoustical wave (SAW) filter, and emerges as first channel 56.

The signal from first node 54 also passes to a second node 68, from whence it is mixed in a fifth mixer 70 with the output of a second delay mechanism 72. During detection, second delay mechanism 72 is turned off, and signals from first delay mechanism 52 are passed directly to fifth mixer 70. However, first delay mixer 52 delays the signals to fifth mixer 70 by a different period than the period by which it delays signals to fourth mixer 64. Therefore, the second channel 58 responds to reflected signals which have gone a different distance, and therefore interfere constructively with signals which have been delayed for a different time, than is true of signals emerging from first channel 56. These distinct ranges are called range bins. The range bins are constructed so that no gap lies between them, in which an object might go undetected, yet so that there is no significant overlap between bins, which would result in a significant under-utilization of the full width of each bin. Bins which satisfy these requirements are called distinct.

In the tracking mode, the second delay mechanism 72 is turned on, and either advances or retards the signal received from the first delay mechanism 52 by approximately one half the width of the pulse 44. The functions of second delay mechanism 72 may be included within first delay mechanism 52 if desired. In FIG. 5, the pulse 74 emerging from first channel 56 is trailed by the pulse 76 emerging from second channel 58. In FIG. 6, the pulse 74 emerging from first channel 56 is led by the pulse 76 emerging from second channel 58. If the second channel pulse 76 is stronger than the first channel pulse 74 when it lags the first channel pulse 74 (FIG. 5), and is weaker when it leads the first channel pulse 74 (FIG. 6), this indicates that a longer delay is more productive than a shorter delay, that is, that the object is further away from the antenna than had been anticipated. In this situation, the tracking mode delay fed to fourth mixer 64 and to second tracking mechanism 72 is increased. If the reverse is true, then this delay is decreased. The apparatus therefore actively servos to the range of the object from the antenna. The output of the fifth mixer 70 is fed to a second narrow bandpass filter 78, much as the output of the fourth mixer 64 was fed to the first narrow bandpass filter 56. Like the first narrow bandpass filter 66, of the second narrow bandpass filter 78 is also preferably a surface acoustical wave filter.

The signal from second node 68 also passes to a third node 80, where it is fed to a first pole 82 of a first switch 84. If the first switch 84 is set to the first pole 82, which it will be in the detection mode, the signal is passed to a sixth mixer 86, which receives a delayed signal from the first delay mechanism 52, this signal being distinctly delayed from the signals passed to the fourth mixer 64 and fifth mixer 70 by a third delay mechanism 88. As with second delay mechanism 72, the functions of third delay mechanism 88 may be included within first delay mechanism 52 if desired. The output of sixth mixer 86 is passed to a third narrow bandpass filter 90, also preferably a surface acoustical wave filter. When the first switch 84 is set to its second pole 92, however, it receives the azimuthal difference signal 94. In this case, the sixth mixer 86 receives a delayed signal from the first delay mechanism 52, the delay being equal to that sent to the fourth mixer 64. This may be accomplished by turning off third delay mechanism 88. Thus, the azimuthal difference signal 94, emitted on third channel 60, will be in the same range bin as the range signal emitted on first channel 56.

The signal from the third node 80 is also passed to a fourth node 96, and thence to a first pole 98 of a second switch 100, from whence it is passed to a seventh mixer 102, the output of which goes to a fourth narrow bandpass filter 104, also preferably a surface acoustical wave filter. In the detection mode, the seventh mixer 102 receives a signal from first delay mechanism 52 which is distinctly delayed from the signals applied to sixth mixer 86, fifth mixer 70, and fourth mixer 64 by a fourth delay mechanism 106. Fourth delay mechanism 106 is also includible within first delay mechanism 52, if desired. This detection mode operation will take place when the second switch 100 is at its first pole 98. In the tracking mode, second switch 100 is set to its second pole 108, and receives an elevational difference signal 110 and receives a delayed signal from first delay mechanism 52 with a delay equal to that applied to sixth mixer 86 and fourth mixer 64. This may be accomplished by turning off fourth delay mechanism 106. That is, the elevational difference signal 110, like the azimuthal difference signal 94, is in the first range bin defined on first channel 56. A mode control 112 locks the switches 84 and 100 together, so that they will be in the same mode. It also operates the first and second delay mechanisms 50 and 52, so that they will operate appropriately for the selected mode.

INDUSTRIAL APPLICABILITY

The present invention is capable of exploitation in industry, and can be used, whenever hardware commonality is desired between the detection and tracking modes of a radar receiver. It can be made of components, which, when taken separately and apart from one another, are entirely conventional, or it can be made from their non-conventional counterparts.

While a particular embodiment of the present invention has been described herein, the true scope and spirit of the present invention are not limited thereto, but are limited only by the following claims.

What is claimed is:

1. A radar receiver for functioning alternatively in detection and tracking modes, the receiver comprising:
   (a) a first channel including a first range delay means for searching an antenna sum signal in a first range bin which, in the tracking mode, includes the range of a tracked object;
   (b) a second channel including a second range delay means for searching the antenna sum signal in a second range bin which,
      in the detection made, is distinct from the first range bin, and which,
      in the tracking mode, lies at alternate edges of the range of the tracked object;
   (c) a third channel including a third range delay means for searching,
      in the detection mode, an antenna sum signal in a third range bin which is distinct from the first and second range bins, and
      in the tracking mode, an antenna azimuthal difference signal in the first range bin; and
   (d) a fourth channel including a fourth range delay means for searching,
      in the detection mode, an antenna sum signal in a fourth range bin which is distinct from the first, second, and third range bins, and
      in the tracking mode, an antenna elevational difference signal in the first range bin.

2. A radar receiver, comprising:
   (a) an antenna producing an azimuthal difference signal, an elevational difference signal, and a range sum signal, the sum signal having a width;
   (b) means for delaying the sum signal by first, second, third, and fourth distinct delay periods, and for diverting them into respective channels;
   (c) means for converting the first delay period to a fifth delay period which includes the delay attributable to a detected object;
   (d) means for converting the second delay period to a sixth delay period which alternates between edges of the width of the sum signal received after the fifth delay period;
   (e) means for converting the third delay period to the fifth delay period, and means for replacing the thus delayed sum signal with a similarly delayed azimuthal difference signal;
   (f) means for converting the fourth delay period to the fifth delay period, and means for replacing the thus delayed sum signal with a similarly delayed elevational difference signal; and
   (g) means for simultaneously actuating, and for simultaneously deactuating, the means of elements (c) through (f).

3. A dual function radar receiver comprising:
   (a) first, second, third, and fourth channels which, in a detection mode, respectively delay a range sum signal by first, second, third, and fourth distinct delay periods;
   (b) means for converting, in a tracking mode, the third and fourth channels to respectively delay azimuthal and elevational difference signals by the delay of the first channel; and
   (c) means for servoing, in the tracking mode, the delay of the first channel to track the range of a detected object by dithering the delay of the second channel.

* * * * *